Dec. 17, 1935. C. CHILOWSKY 2,024,966
ELECTRIC AND MAGNETIC MEASURING DEVICE
Filed Nov. 18, 1933
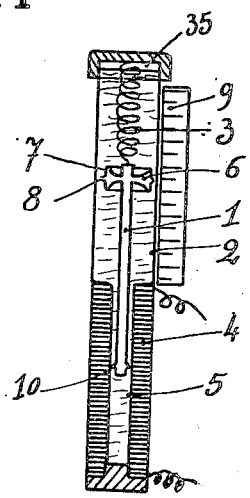
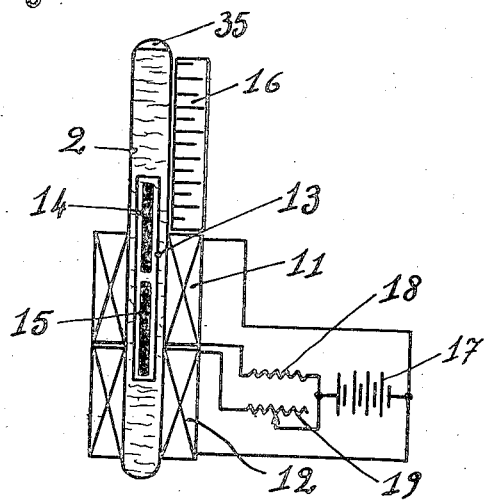
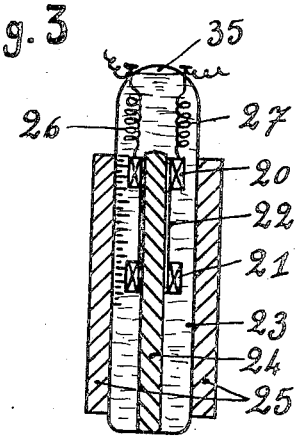
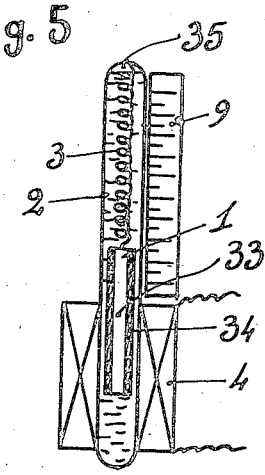
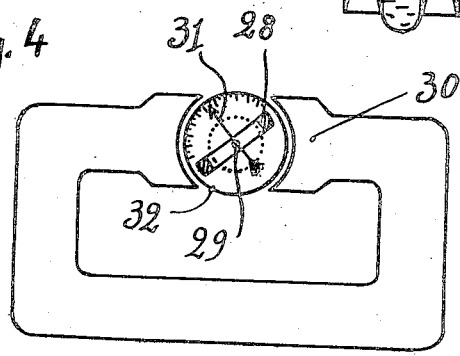
C. Chilowsky
INVENTOR
By: Markt Clerk
Attys.

Patented Dec. 17, 1935

2,024,966

UNITED STATES PATENT OFFICE 2,024,966

ELECTRIC AND MAGNETIC MEASURING DEVICE

Constantin Chilowsky, Paris, France

Application November 18, 1933, Serial No. 698,711
In Belgium November 24, 1932

7 Claims. (Cl. 171—95)

My present invention relates to improvements in electrical and magnetic measuring devices, based on the electro-magnetic or electro-dynamic phenomena, in which a movable element, placed in a magnetic or electric field, moves under the influence of the variations of this field, the said variations being utilized for the evaluation of this field or the electric phenomenon producing it.

In the devices of this kind known up till now, viz. galvanometers, voltmeters, ammeters etc., the movable element is almost always fitted in such a way as to rotate about an axis. When this is not the case, the apparatus requires very delicate handling, as in wire-suspension galvanometers, for instance.

My present invention relates to a form of suspension for the movable element of a device of the aforesaid kind, enabling the said element to move with very little friction, the apparatus thus realized being, however, of simple construction and not delicate as regards handling.

The improvement, with which my present invention deals, consists in immerging the movable element completely in a liquid, whereby this liquid is acted upon by one or several other forces, at the same time as it is subjected to the action of the field to be measured, so that, for every value of the said field, the movable element takes up a position of equilibrium, the coordinate of which on a suitable scale thus measures the value of the field or of the electric phenomenon, from which the said field results.

Provision is made for compensating the whole, or a large part of the weight, of the movable element by immerging it completely in a liquid of the same density as the mean density of the said movable element or, in certain cases, of a density of very nearly the same value as this latter.

The total immersion of the movable element in the said liquid is effected in such a way that the movable element comes into contact with no free surface of the liquid anywhere in the volume in which the said element moves. In this way, I completely eliminate the action of the capillary forces of the liquid on the movable element and thus make this latter extremely sensitive to the actions of the forces and fields acting on it. Indeed, the action of the force of gravity and even the forces of the accelerations given to the apparatus can thus be completely suppressed and the action of the capillary forces eliminated, so that the movable element, or float, of the measuring device floats freely, entirely enclosed by liquid, and reacts to the slightest variation of the forces acting on it.

In most cases, I make provision for placing the float in the liquid in a position of indifferent equilibrium, i. e. in such a way that the centre of gravity of the float coincides with the centre of gravity of a homogeneous body of the same volume and the same shape. Under these conditions, the apparatus can work in all positions, and not only in a vertical position.

The complete immersion of the float and the elimination of the action of the capillary forces makes it possible—and this is an essential element of my invention—to give the metal part of the movable element a pointed and very elongated shape, this pointed movable element effecting its movements in a tube containing the liquid.

As the movable element is usually constructed of metal (magnetic bar, soft iron bar, copper wire coil), provision is made for incorporating, in this movable element, material of low specific gravity and for using a supporting liquid of high density. Instead of the incorporation of low density material, a closed hollow body can also be used as movable element, whereby the said closed hollow body can be such as to react to the action of the field (closed tube of soft iron or magnetized sheet steel), or can itself be made of some inert matter (ebonite, bakelite) containing soft iron or a magnet.

Provision is made for several means of creating an opposing force acting on the movable element and compensating the action of the field to be measured.

Provision is made for creating the said opposing force by producing an auxiliary field, distinct from the field to be measured, by any suitable means, such as a permanent magnet, an electromagnet or a solenoid. However, in most cases, the movable element is subject to the elastic action of a spring.

It is a well known fact that a body, when plunged into a liquid, receives an upthrust equal to the weight of water displaced. Now, when the temperature varies, the density of a liquid, and thus also the upthrust, varies with it.

Provision is therefore made for means of preventing the variations from influencing the results registered by the apparatus. The said means consist of measures which make the upthrust remain very nearly constant in spite of variations of temperature.

The main means of attaining this end is the suitable choice of the liquid. Special provision is therefore made for the use of water and aqueous solutions of low concentration as supporting liquid for the hydraulic suspension of the movable element, as water has by far the lowest coefficient of expansion of all liquids. The ratio between the thickness of the walls and the diameter of the hollow soft iron tube forming the movable element will therefore be chosen in such a way that the mean density of the tube will be about 1, according to the concentration of the solution. Before closing the recipient, it is advisable to leave a small space, filled with air or even containing a vacuum, outside the path of the movable element, so as to allow the liquid to expand freely.

A second means of attaining the said aim consists of providing a movable element with a mean coefficient of expansion equal to that of the liquid, i. e. the volumetric expansion of which for any increase of temperature is the same as the volumetric expansion of a quantity of the liquid having the same volume as the said element. For this purpose, the movable element is made of a hollow body or an ebonite tube, closed at the ends, inside or outside which a sheet of soft iron, preferably rolled in the form of a tube, is placed. As ebonite has approximately the same coefficient of expansion as water, the thermic compensation thus reaches a very high degree of efficiency.

However, it is sometimes advisable—and provision is made for this—to use specially dense liquids as suspension liquids, such as solutions of heavy salts and, more particularly, organic liquids such as bromoform, in order to reduce the volume of the movable element. These liquids have a comparatively high coefficient of expansion. In this case, the float or movable element is made of wax or paraffin wax, which have a very high coefficient of expansion, and with which the hollow soft iron tube is filled. The said tube is of oval cross-section, so that it can easily follow the expansion of the said substances, the desired thermic compensation thus being obtained.

Among liquids of low density, special provision is made, besides, for the use of distilled water with an alkaline solution, especially soda, which has the advantage of protecting the spring and the movable element from rust and of greatly lowering the freezing point of the water. Furthermore, provision is also made for the use of an alcohol solution as suspension liquid. The low-density liquids considered can be combined with tubular floats of large diameter with thin walls, so as to reduce the magnetic resistance of the part of the magnetic circuit outside the float, thus approaching the saturation of the tubular soft iron body with weak fields.

Provision is made for different types of apparatus on the aforesaid bases. The most simple ones, viz. ammeters and voltmeters, are based on the interaction of a long solenoid, placed preferably outside the tube containing the liquid, and a pointed movable element, made of soft iron or magnetized steel and preferably tubular, suspended on a spring in the tube containing the liquid and drawn into the solenoid.

In other apparatus, of the ohmmeter kind, the action of the spring is replaced by that of a second opposing solenoid. In other apparatus again, the movable body itself is a solenoid suspended on two springs, which also serve as feed lines for the current. An apparatus of this kind can be used as a wattmeter, through one of the solenoids of which passes a current proportional to the voltage, while a current proportional to the amperage flows through the other. The said movable solenoid can move, in the form of a ring or a hollow cylinder, concentrically and along a soft iron rod or an equivalent system, the seat of a radial magnetic field produced by a magnet. The solenoid can be reduced to a copper tube, in which case the apparatus can act as a frequency-meter.

Provision is also made, in general, in accordance with my present invention, for the extension of the said method of hydraulic suspension to electric measuring devices, in which the movable element is normally suspended mechanically in a liquid, the density of which is equal to the mean density of the movable part of the apparatus, especially to moving-coil instruments, in which the coil is fitted to a pivot or suspended on wires. In this way, a combination of the two modes of suspension (hydraulic and mechanic) is attained. The mechanical mode of suspension merely acts as a guide for the movable element and is thus much less fragile and more sensitive, as the wear of the pivots has been eliminated.

In certain cases, it may be necessary to neutralize the action of the earth's magnetism on the moving element. In this case, the said moving element is formed by two magnets or two coils arranged along the same axis, the north-south directions of the magnets or coils being opposed to each other.

The apparatus described above can be used with alternating or direct currents flowing through the solenoid producing the field, according to the type of apparatus.

It has been shown that the moving element can be constructed of magnetized steel or soft iron, or formed by a winding through which a current flows, which is fed to the said winding through flexible conductors, or short-circuited in itself, and forming the seat of the induction current, the said winding being also possible as a tube, whereby these various modes of realization comprise, preferably, the form of a watertight tube or are connected to such a tube.

With reference to the drawings, Fig. 1 is a sectional view of an apparatus in accordance with my present invention; Fig. 2 is an alternative form of Fig. 1; Fig. 3 is another alternative form of Fig. 1; Fig. 4 shows the application of the liquid mode of suspension, in accordance with the present invention, to an ordinary moving-coil instrument; Fig. 5 is a third alternative form of Fig. 1.

In Fig. 1, the moving element is formed of the tube 1, made of soft iron and suspended inside the tube 2, which is made of transparent material, by means of the spring 3. The field-generating current enters the coil 4, preferably formed of one single layer of rectangular cross-section and wound round the lower, tapered-off part 5 of the tube 2. The higher part of the tube 1 comprises a shoe 6, which, like the tube itself, is made of soft iron. This shoe, through which the lines of force passing through the tube find an exit, enables the path of the moving element 1 to be increased.

On the other hand, a guide-line 8 can be traced on the outer cylindrical surface 7 of this shoe, the surface being coloured so that this guide-line is easily distinguishable and can therefore be conveniently placed with respect to the graduated scale 9.

The lower part of the bar 1 is preferably fitted with small projections 10, forming centering stars.

In order to be able to apply a high-intensity current to the apparatus, without having an excessive number of ampere-turns, but nevertheless obtaining a uniform field, provision is made for forming the coil 4 from a thin metal strip, suitably insulated and wound in spirals round the part 5.

Figure 2 shows an alternative form of the Fig. 1, in which the current which is to be studied enters the coil 11, the opposing force for the compensation of this field being produced by the coil 12. In this case, the moving element is a tube 13, which is made with a non-magnetic material, such as ebonite or bakelite, containing two magnetized bars 14 and 15, the poles of which, that are close together, being of the same polarity (both north or both south poles) so that the system formed is not submitted to the earth's magnetism. The system moves, with respect to the scale 16, according to the ratio between the actions of the two coils 11 and 12.

An instrument of this kind forms an ohmmeter when the two coils are connected to the terminals of a source of current 17. It enables the currents passing through the two circuits to be compared and, consequently, the ratio between the two resistances 18 and 19 can be determined. If one of the resistances is a variable-resistance photo-electric cell, while the other resistance is non-variable, the complete instrument forms an exposure-measuring device.

The Fig. 3 shows an alternative form of the preceding figures, in which the moving element is formed of two small solenoids 20 and 21 joined by a tube 22. They are hydraulically suspended in the annular-shaped container 23, through the centre of which the magnetized bar 24 passes and round which the bars 25 are arranged. Between this magnet 24 and the said bars 25, there is a radial field which acts on the solenoids 20 and 21, these latter, placed at a distance of one half of the length of the magnet 24, are traversed by magnetic fluxes; the sum of which remains constant in spite of the variation of the field along the magnet.

The solenoids 20 and 21 are suspended in the container 23 by means of two springs 26 and 27, which, at the same time, act as feed-lines for the same.

Fig. 4 is a schematic view of a moving-coil measuring instrument, the moving coil 28 of which rotates about its axis 29 and which moves in the field produced by the magnet 30. This moving coil is enclosed in the cylindrical container 32, which is watertight and filled with liquid, preferably a heavy liquid such as bromoform. The indicating needle 31 is attached rigidly to this coil.

Fig. 5 shows an alternative form of the Fig. 1, in which the moving element 1, suspended inside the tube 2 by means of the spring 3, is an ebonite tube 33, on which a magnetized sheet of metal 34 is wound in such a manner as to be able to unroll slightly in order to allow for the expansion of the ebonite.

This moving element could also take the form of an ebonite tube, round which a copper wire is wound, the current being led to this solenoid through flexible conductors.

In all the instruments described above, a small space 35 is left at the top of the tubes, full of air or containing a vacuum, so as to allow the liquid to expand freely without danger of bursting the tube.

I claim as my invention:

1. An instrument for electric measurements comprising a fixed electromagnetic field producing element, a container disposed in the field of said element, a fluid of predetermined density in said container, a movable element immersed in said fluid, one part of said element being of magnetic material, the density of said movable element being equal to that of said fluid.

2. An instrument for electric measurements comprising a fixed electromagnetic field producing element, a container placed in the field so produced, a fluid of predetermined density in said container, a movable element immersed in said fluid, one part of said movable element being made of a magnetic material, the density of said movable element being equal to that of the fluid, said movable element moving under the action of said produced field to be measured and under the action of a force variable with the position of said movable element, these two actions being opposed, and the resulting displacements of said movable element measuring the intensity of said field to be measured.

3. An instrument for electric measurements comprising a fixed electromagnetic field producing element, a container placed in the field so produced, a fluid of predetermined density in said container, a movable element immersed in said fluid, one part of said movable element being made of a magnetic material, the density of said movable element being equal to that of the fluid and the centre of gravity of said movable element coinciding with the centre of gravity of a homogeneous body of the same volume, said movable element moving under the action of said produced field to be measured and under the action of a force variable with the position of said movable element, these two actions being opposed, and the resulting displacements of said movable element measuring the intensity of said field to be measured.

4. An instrument for electric measurements comprising a fixed electromagnetic field producing element, a container placed in the field so produced, a fluid of predetermined density in said container, a movable element immersed in said fluid, one part of said movable element being made of a magnetic material, a spring, the density of this movable element being equal to that of the fluid, said movable element moving under the action of said produced field to be measured and under the action of said spring, these two actions being opposed, and the resulting displacements of said movable element measuring the intensity of said field to be measured.

5. An instrument for electric measurements comprising a fixed electromagnetic field producing element, a container placed in the field so produced, a fluid of predetermined density in said container, a movable element immersed in said fluid, one part of said movable element being made of a magnetic material, the density of this movable element being equal to that of the fluid, an auxiliary field producing element, said movable element moving under the action of said produced field to be measured and under the action of said auxiliary field producing element, the actions of the two fields being opposed and the resulting displacements of said movable element measuring the intensity of said field to be measured.

6. An instrument for electric measurements comprising a fixed electromagnetic field producing element, a container placed in the field so produced, a fluid of predetermined density in said container, a movable element immersed in said fluid, one part of said movable element being made of a magnetic material, the density of this movable element being equal to that of the fluid, the compensation of the variations in the upthrust of the liquid due to its thermic expansion being obtained by means of the use of water as fluid, said moving element including an ebonite tube containing a bar of magnetic material, said ebonite having exactly the same coefficient of expansion as water, said movable element moving under the action of said produced field to be measured and under the action of a force variable with the position of said movable element, these two actions being opposed, and the resulting displacements of said movable element measuring the intensity of said field to be measured.

7. An instrument for electric measurements comprising a fixed electromagnetic field producing element, a container placed in the field so produced, a fluid of predetermined density in said container, a movable element immersed in said fluid, one part of said movable element being made of a magnetic material, the density of this movable element being equal to that of the fluid, the compensation of the variations in the upthrust of the liquid due to its thermic expansion being obtained by an aqueous solution of caustic soda as suspension fluid, and said movable element including a hollow tube of magnetic material of the same mean density as the said solution, said movable element moving under the action of said produced field to be measured and under the action of a force variable with the position of said movable element, these two actions being opposed, and the resulting displacements of said movable element measuring the intensity of said field to be measured.

CONSTANTIN CHILOWSKY.